(12) United States Patent
Liu et al.

(10) Patent No.: US 11,650,449 B2
(45) Date of Patent: May 16, 2023

(54) DISPLAY PANEL AND DISPLAY APPARATUS

(71) Applicant: BOE TECHNOLOGY GROUP CO., LTD., Beijing (CN)

(72) Inventors: Wenqu Liu, Beijing (CN); Qi Yao, Beijing (CN); Feng Zhang, Beijing (CN); Zhijun Lv, Beijing (CN); Liwen Dong, Beijing (CN); Xiaoxin Song, Beijing (CN); Zhao Cui, Beijing (CN); Detian Meng, Beijing (CN); Libo Wang, Beijing (CN); Jifeng Tan, Beijing (CN); Xiandong Meng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 404 days.

(21) Appl. No.: 16/964,106

(22) PCT Filed: Sep. 3, 2019

(86) PCT No.: PCT/CN2019/104221
§ 371 (c)(1),
(2) Date: Jul. 22, 2020

(87) PCT Pub. No.: WO2021/042267
PCT Pub. Date: Mar. 11, 2021

(65) Prior Publication Data
US 2022/0334429 A1     Oct. 20, 2022

(51) Int. Cl.
*G02F 1/1335*     (2006.01)
*G02F 1/1333*     (2006.01)
(Continued)

(52) U.S. Cl.
CPC ......... *G02F 1/133512* (2013.01); *G02B 6/00* (2013.01); *G02B 6/005* (2013.01);
(Continued)

(58) Field of Classification Search
CPC ......... G02F 1/133512; G02F 1/136209; G02F 1/134309; G02F 1/1343
See application file for complete search history.

(56) References Cited

U.S. PATENT DOCUMENTS 6,493,052 B1 * 12/2002 Satake ............. G02F 1/133553
                                                         349/114
2007/0212498 A1 * 9/2007 Fukushige ............. G02B 1/111
                                                         428/1.31

(Continued)

FOREIGN PATENT DOCUMENTS

CN    106526942 A * 3/2017 ........... G02F 1/1333
CN    107238974 A * 10/2017 ........... G02B 6/0016

*Primary Examiner* — Jonathan Y Jung
(74) *Attorney, Agent, or Firm* — Armstrong Teasdale LLP

(57) ABSTRACT

The embodiments of the present disclosure provide a display panel. The display panel includes a first substrate, a second substrate disposed opposite to the first substrate, and a liquid crystal layer between the first substrate and the second substrate, a plurality of first electrodes disposed on a side, close to the second substrate, of the first substrate and spaced apart at intervals, a first dielectric layer for planarizing the plurality of first electrodes, a second dielectric layer disposed on a side, close to the liquid crystal layer, of the first dielectric layer, a light shielding portion disposed on the side, close to the liquid crystal layer, of the second substrate, and a control circuit configured to apply a voltage between the first electrode and the second electrode so that the liquid crystal layer is in a first state or a second state.

19 Claims, 4 Drawing Sheets

(51) Int. Cl.
  *G02F 1/137* (2006.01)
  *F21V 8/00* (2006.01)
  *G02F 1/1337* (2006.01)
  *G02F 1/1343* (2006.01)
  *G02B 6/00* (2006.01)
  *G02F 1/13357* (2006.01)

(52) U.S. Cl.
  CPC ........ *G02F 1/1337* (2013.01); *G02F 1/13439* (2013.01); *G02F 1/13756* (2021.01); *G02F 1/133357* (2021.01); *G02F 1/133603* (2013.01); *G02F 1/133607* (2021.01); *G02F 1/134309* (2013.01)

(56) References Cited

U.S. PATENT DOCUMENTS

| | | | | |
|---|---|---|---|---|
| 2008/0020202 | A1* | 1/2008 | Nashiki | G06F 3/0488 428/337 |
| 2011/0149204 | A1* | 6/2011 | Son | G02B 6/009 362/97.3 |
| 2013/0070188 | A1* | 3/2013 | Ishikawa | H04N 13/31 349/110 |
| 2014/0218664 | A1* | 8/2014 | Nimura | G02F 1/133526 349/95 |
| 2015/0022496 | A1* | 1/2015 | Kim | H02K 33/18 345/174 |
| 2020/0142247 | A1* | 5/2020 | Zhao | G02F 1/133504 |
| 2021/0325729 | A1* | 10/2021 | Tan | G02F 1/133611 |

* cited by examiner

DISPLAY PANEL AND DISPLAY APPARATUS

CROSS REFERENCE TO RELATED APPLICATIONS

This patent application is a National Stage Entry of PCT/CN2019/104221 filed on Sep. 3, 2019, the disclosure of which is incorporated by reference herein in its entirety as part of the present application.

BACKGROUND

The present disclosure relates to the field of display techniques, and in particular, to a display panel and a display apparatus.

Liquid crystal display apparatus is a major Flat Panel Display (simply referred to as FPD for short). Because of its small size, low power consumption, no radiation, and relatively low production cost, it is widely used in the field of high-performance displays.

BRIEF DESCRIPTION

The embodiments of the present disclosure provide a display panel and a display apparatus.

A first aspect of the present disclosure provides a display panel. The display panel includes a first substrate, a second substrate disposed opposite to the first substrate, and a liquid crystal layer between the first substrate and the second substrate, a plurality of first electrodes disposed on a side, close to the second substrate, of the first substrate and spaced apart at intervals, a first dielectric layer for planarizing the plurality of first electrodes, a second electrode disposed between the first substrate and the second substrate, a second dielectric layer disposed on a side, close to the liquid crystal layer, of the first dielectric layer, a light shielding portion disposed on the side, close to the liquid crystal layer, of the second substrate, and a control circuit configured to apply a voltage between the first electrode and the second electrode so that the liquid crystal layer is in a first state or a second state, in the first state, the liquid crystal layer being able to converge a light incident from a side, close to the first substrate, of the liquid crystal layer to the light shielding portion, and in the second state, the liquid crystal layer being able to diffuse the light to a portion between the light shielding portions to exit from the second substrate, wherein a refractive index of the second dielectric layer is greater than refractive indexes of the first electrode and the first dielectric layer.

In an embodiment of the present disclosure, a surface of the first dielectric layer close to the liquid crystal layer is flush with a surface of the first electrode close to the liquid crystal layer.

In an embodiment of the present disclosure, a surface of the first dielectric layer close to the liquid crystal layer covers a surface of the first electrode close to the liquid crystal layer.

In an embodiment of the present disclosure, a refractive index of the first dielectric layer is greater than or equal to a refractive index of the first electrode.

In an embodiment of the present disclosure, a thickness of the first electrode is greater than or equal to 200 angstroms, and a distance between adjacent first electrodes is less than or equal to 50 microns, a thickness of the first dielectric layer is between 1 micrometer and 1.5 micrometers, a thickness of the second dielectric layer is greater than or equal to 1000 angstroms, and a refractive index of the second dielectric layer is between 1.846 and 2.095.

In an embodiment of the present disclosure, a thickness of the first electrode is about 200 angstroms, a width of the first electrode is about 3 µm, and a distance between adjacent first electrodes is about 3 µm, a thickness of the first dielectric layer is about 1.5 µm, a thickness of the second dielectric layer is about 1000 angstroms, and a refractive index of the second dielectric layer is about 1.98.

In an embodiment of the present disclosure, a light leakage rate of the display panel is less than or equal to 0.0051%.

In an embodiment of the present disclosure, the display panel further includes a third dielectric layer disposed between the plurality of first electrodes and the first substrate, wherein the second electrode is disposed between the first substrate and the third dielectric layers.

In an embodiment of the present disclosure, the second electrode is disposed on the side, close to the liquid crystal layer, of the second substrate.

In an embodiment of the present disclosure, the plurality of first electrodes are strip-shaped electrodes or dot-shaped electrodes, and the second electrode is a planar electrode.

In an embodiment of the present disclosure, the display panel further includes a first alignment layer between the liquid crystal layer and the first substrate and in contact with the liquid crystal layer, and a second alignment layer between the liquid crystal layer and the second substrate and in contact with the liquid crystal layer.

In an embodiment of the present disclosure, a material of the second dielectric layer includes silicon nitride.

In an embodiment of the present disclosure, a material of the first dielectric layer includes resin.

In an embodiment of the present disclosure, materials of the first electrode and the second electrode include transparent conductive materials.

In an embodiment of the present disclosure, the transparent conductive material includes indium tin oxide.

In an embodiment of the present disclosure, the display panel further includes a thin film transistor between the first electrode and the first substrate.

A second aspect of the present disclosure provides a display apparatus. The display apparatus includes any one of the display panels described in the first aspect of the present disclosure, and a backlight module located on a side, away from a second substrate, of a first substrate of the display panel.

In an embodiment of the present disclosure, the backlight module includes a light guide plate having a light-emitting surface, a bottom surface opposite to the light-emitting surface, and an end face between the light-emitting surface and the bottom surface, a light source located on a side of the end face of the light guide plate, a light extraction member located on a side of the light-emitting surface of the light guide plate.

In an embodiment of the present disclosure, the display apparatus further includes a light shielding portion located on a side, close to the liquid crystal layer, of the second substrate of the display panel, wherein projections of the light extraction member and the light shielding portion on the first substrate at least partially overlap.

In an embodiment of the present disclosure, the light source includes a monochromatic LED light source, a monochromatic OLED light source, or a monochromatic laser light source.

In an embodiment of the present disclosure, the light extraction member includes any one of an inclined grating, a holographic Bragg grating, and a step grating.

In an embodiment of the present disclosure, the second substrate further serves as the light guide plate.

Further adaptive aspects and scope will become apparent from the description provided herein. It should be understood that various aspects of the present application may be implemented alone or in combination with one or more other aspects. It should also be understood that the description and specific embodiments herein are intended to be illustrative and not limiting the scope of this application.

BRIEF DESCRIPTION OF THE DRAWINGS

The drawings described herein are only for the purpose of illustrations of the selected embodiments rather than any possible implementation, and they are not intended to limit the scope of this application, in which.

DETAILED DESCRIPTION

To make the technical solutions and advantages of the embodiments of the present disclosure more clear, the technical solutions of the embodiments of the present disclosure will be described clearly and completely in conjunction with the drawings of the embodiments of the present disclosure. Obviously, the described embodiments are only a part of the embodiments of the present disclosure, but not all the embodiments. Basing on the described embodiments of the present disclosure, all other embodiments obtained by a person of ordinary skill in the art without creative efforts fall within the protection scope of the present disclosure. Hereinafter, embodiments of the present disclosure will be described in detail with reference to the drawings and in conjunction with the embodiments. It should be noted that the features in the embodiments of the present disclosure can be combined with each other without conflict.

Figure 1:
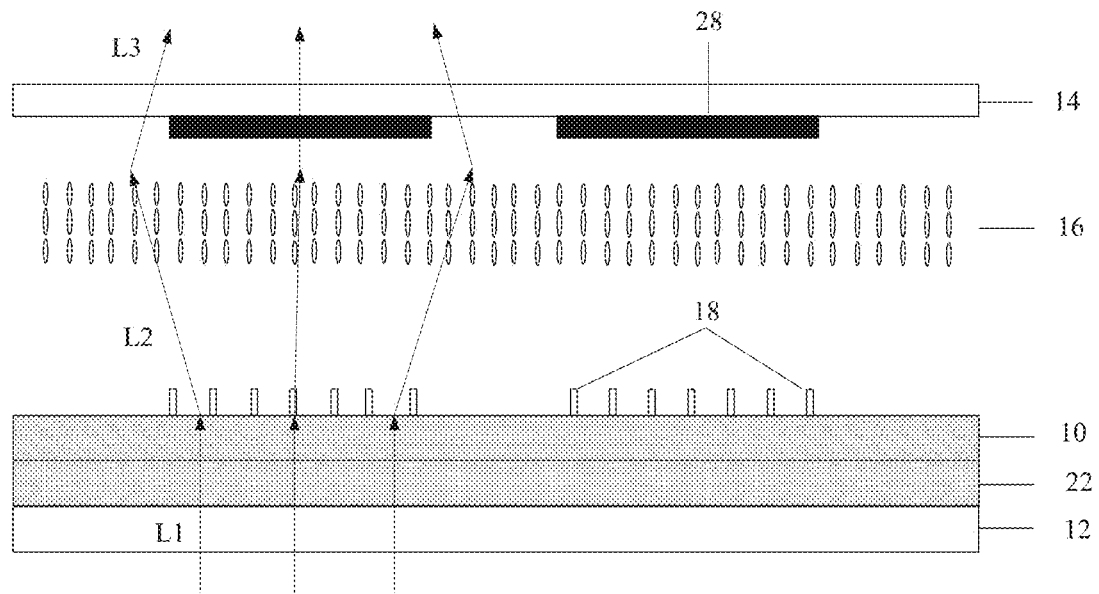
FIG. 1 schematically shows a cross-sectional view of a display panel.

FIG. 1 schematically shows a cross-sectional view of a display panel. As shown in FIG. 1, the display panel includes a second electrode 22 (i.e., a common electrode), an insulating layer 10, a plurality of first electrodes 18 (i.e., pixel electrodes), a liquid crystal layer 16 and a light shielding portion 28 that are sequentially disposed between a first substrate 12 and a second substrate 14. When the display panel is displayed in a bright state, a voltage applied between the first electrode and the second electrode causes the liquid crystal layer to operate in a grating equivalent unit mode. The grating equivalent unit diffuses the light incident on the liquid crystal layer to a portion between the light shielding portion, such that the light is emitted from the second substrate, thereby achieving the bright state. When the display panel is displayed in a dark state, as shown in FIG. 1, the inventor found that the distance between adjacent first electrodes is close to the wavelength of light. The collimated light L1 is diffracted at the first electrode, and generating diffracted light L2. Then, the diffracted light L2 is converged, by the liquid crystal layer operating in the lens equivalent unit mode by the voltage between the first electrode and the second electrode, into light L3 toward the light shielding portion. The light L3 is shielded by the light shielding portion, thereby achieving the dark state. However, since the diffraction effect of the first electrode on the light L1 adversely increases the divergence angle of the diffracted light L2, the light L3 cannot be completely shielded by the light shielding portion, resulting in light leakage from the display panel. In order to avoid light leakage from the display panel, the width of the light shielding portion may be increased, but this will disadvantageously reduce the aperture ratio of the display panel.

Figure 2:
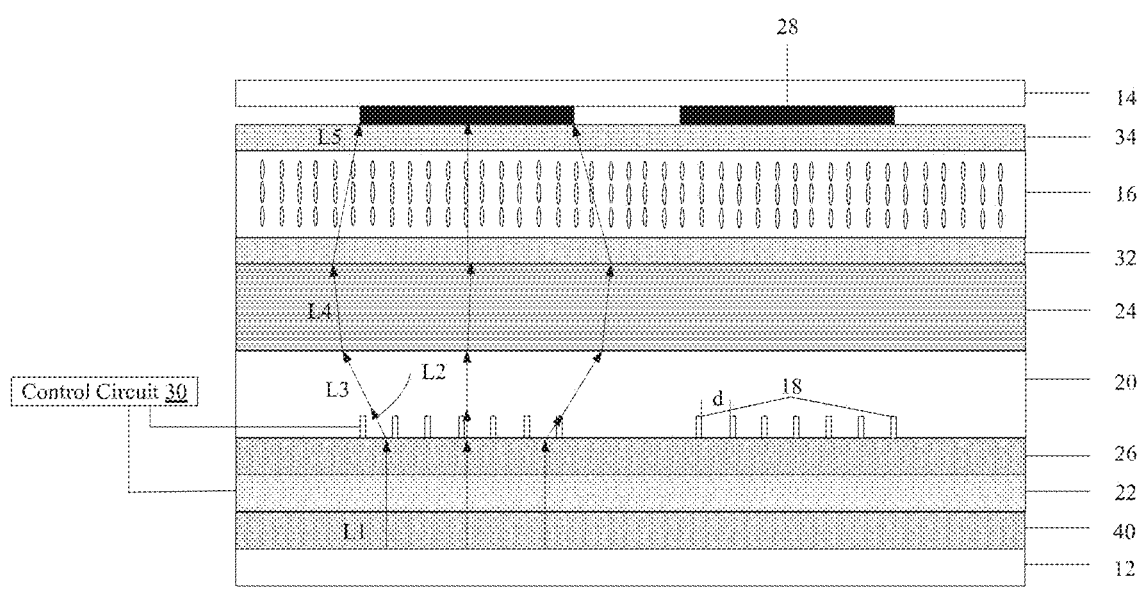
FIG. 2 schematically shows a cross-sectional view of a display panel according to an embodiment of the present disclosure.

FIG. 2 schematically shows a cross-sectional view of a display panel according to an embodiment of the present disclosure. As shown in FIG. 2, the display panel may include a first substrate 12, a second substrate 14 opposite to the first substrate 12, and a liquid crystal layer 16 between the first substrate 12 and the second substrate 14, a plurality of first electrodes 18 disposed on a side, close to the second substrate 14, of the first substrate 12 and spaced apart at intervals, a first dielectric layer 20 for planarizing the plurality of first electrodes 18, a second electrode 22 disposed between the first substrate 12 and the second substrate 14, and a second dielectric layer 24 disposed on the side, close to the liquid crystal layer 16, of the first dielectric layer 20.

In the embodiment of the present disclosure, distance d between adjacent first electrodes (as shown in FIG. 2) is less than or equal to 50 microns. In one example, the distance between adjacent first electrodes may be 3 microns, and the width of the first electrodes may be 3 microns. According to actual needs, the distance between adjacent first electrodes and the width of the first electrodes can also be selected as other values.

In the embodiment of the present disclosure, a refractive index of the second dielectric layer 24 is greater than refractive indexes of the first electrode 18 and the first dielectric layer 20. The refractive index of the second dielectric layer may be between 1.846 and 2.095. The material of the first dielectric layer 20 may include resin, and the material of the second dielectric layer 24 may include silicon nitride. The materials of the first electrode 18 and the second electrode 22 include transparent conductive materials, such as indium tin oxide and the like. It should be understood that due to the different conditions for forming silicon nitride (for example, the deposition temperature or the ratio of the reaction gas nitrogen to silicon), there will be differences in the composition and microstructure of silicon nitride. So that the refractive index of silicon nitride may be different, for example, the refractive index of silicon nitride may include any one of the following: 2.095, 2.05, or 1.98. In the example of the present disclosure, the thickness of the second dielectric layer is greater than or equal to 1000 angstroms. In one example, the thickness of the second dielectric layer is 1000 angstroms. According to actual needs, the thickness of the second dielectric layer can also be selected to other values. It should be noted that, in the present application, the thickness refers to a distance extending along the longitudinal direction of the first substrate.

The display panel shown in FIG. 2 may further include a light shielding portion 28 on the side, close to the liquid crystal layer 16, of the second substrate 14. In the embodiment of the present disclosure, the light shielding portion 28 is closer to the second substrate 14 than the second dielectric layer 24.

In the embodiments of the present disclosure, the display panel may further include a color filter layer (not shown) between the light shielding portions. The color filter layer may include quantum dots. In this example, the light coupled out of the liquid crystal layer can excite the quantum dots to emit light with different colors, thereby enabling color display.

The display panel shown in FIG. 2 may further include a control circuit 30. The control circuit 30 is configured to apply a voltage between the plurality of first electrodes 18 and the second electrode 22 so that the liquid crystal layer 16 is in a first state or a second state. In the embodiment of the present disclosure, when the display panel is in the first state (for example, a dark state), the light incident from the side, close to the first substrate 12, of the liquid crystal layer 16 is converged to the light shielding portion 28, and the liquid crystal layer 16 is equivalent to forming a plurality of lens equivalent units; when the display panel is in the second state (for example, a bright state), light incident from the side, close to the first substrate 12, of the liquid crystal layer 16 (for example, by diffraction) is diffused to the portion between the light shielding portions 28 to be emitted from the second substrate 14, and the liquid crystal layer 16 is equivalent to forming a plurality of grating equivalent units.

Figure 8A:
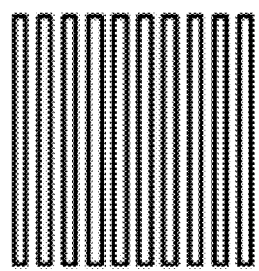
FIGS. 8A and 8B schematically show two first electrodes with different shapes.
Figure 8B:
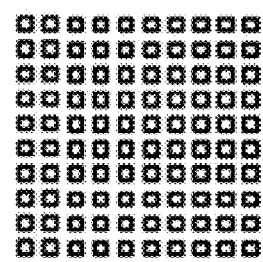

In the embodiment of the present disclosure, the plurality of first electrodes 18 may be pixel electrodes, which may be a plurality of strip-shaped electrodes arranged in parallel (as shown in FIG. 8A on the left), or dot-shaped electrodes arranged in an array in a plane (as shown in FIG. 8B on the right), or electrode with other shapes that can control the deflection of liquid crystal molecules together with the second electrode. The second electrode may be a common electrode, which may be a planar electrode.

In the embodiment of the present disclosure, as shown in FIG. 2, a surface of the first dielectric layer 20 close to the liquid crystal layer 16 covers a surface of the first electrode 18 close to the liquid crystal layer 16. That is, the thickness of the first dielectric layer 20 is greater than the thickness of the first electrode 18, so that the surface of the first electrode 18 is planarization. In an embodiment of the present disclosure, the thickness of the first electrode is greater than or equal to 200 angstroms, and the thickness of the first dielectric layer is between 1 micrometer and 1.5 micrometers. If the thickness of the first electrode is larger, the cost for manufacturing the display panel is higher, and the overall thickness of the display panel is also larger. If the thickness of the first electrode is smaller, the square resistance of the first electrode is larger, the driving voltage and the power required are greater. Therefore, the thickness of the first electrode may be 200 angstroms. The thickness of the first dielectric layer may be 1.5 microns. According to actual needs, the thickness of the first electrode and the thickness of the first dielectric layer can also be selected to other values.

In addition, the refractive index of the first dielectric layer 20 is greater than or equal to the refractive index of the first electrode 18. In the case where the refractive index of the first dielectric layer 20 is equal to the refractive index of the first electrode 18, the effect of the display panel on light will be described in detail with reference to FIG. 2. In the case where the refractive index of the first dielectric layer 20 is greater than the refractive index of the first electrode 18, the effect of the display panel on light will be described in detail with reference to FIG. 3.

In the display panel shown in FIG. 2, the refractive index of the first dielectric layer 20 is equal to the refractive index of the first electrode 18. When the display panel is displayed in the dark state, as shown in FIG. 2, firstly, the collimated light L1 is diffracted at the first electrode 18 to generate diffracted light L2. Since the refractive index of the first dielectric layer 20 is equal to the refractive index of the first electrode 18, the diffracted light L2 is not refracted at the first dielectric layer 20, and L3 continues to propagate along the optical path of L2. Then, since the refractive index of the second dielectric layer 24 is greater than the refractive index of the first dielectric layer 20, the light L3 is refracted at the second dielectric layer 24, which is refracted into light L4. According to the law of refraction, the exit angle of the light L4 is smaller than the incident angle of the light L3. Therefore, the light L4 converges toward the light shielding portion 28 more than the light L3. Next, the light L4 is converged, by the liquid crystal layer 16 operating in the first state by the voltage between the first electrode 18 and the second electrode 22, into the light L5 toward the light shielding portion 28. Compared with the display panel shown in FIG. 1, when the light L5 reaches the light shielding portion 28 on the second substrate 14, the light L5 can be substantially completely shielded by the light shielding portion, which can effectively reduce the light leakage rate. Herein, the light leakage rate means the ratio of amount of light incident to the display panel to amount of light emitted from the display panel.

Figure 3:
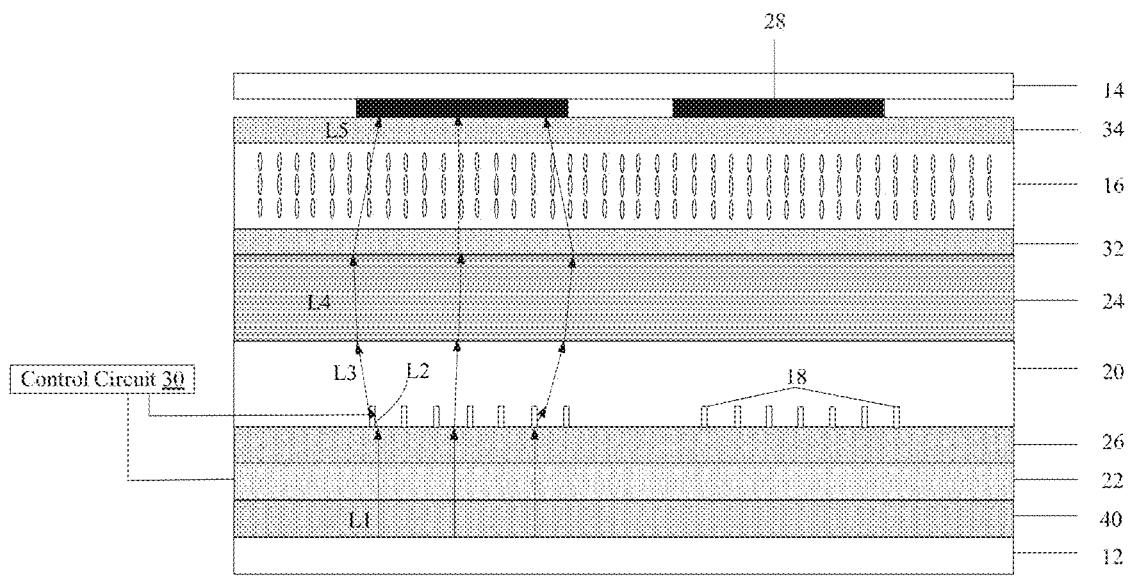
FIG. 3 schematically shows a cross-sectional view of a display panel according to yet another embodiment of the present disclosure.

FIG. 3 schematically shows a cross-sectional view of a display panel according to yet another embodiment of the present disclosure. The display panel shown in FIG. 3 has the same structure as the panel shown in FIG. 2, except that the refractive index of the first dielectric layer 20 is greater than the refractive index of the first electrode 18. When the display panel is displayed in the dark state, as shown in FIG. 3, firstly, the collimated light L1 is diffracted at the first electrode 18 to generate diffracted light L2. Since the refractive index of the first dielectric layer 20 is greater than the refractive index of the first electrode 18, the diffracted light L2 is refracted at the first dielectric layer 20, which is refracted into light L3. According to the law of refraction, the exit angle of the light L3 is smaller than the incidence angle of the light L2. Therefore, the light L3 converges toward the light shielding portion 28 more than the light L2. Then, the light L3 is further refracted into light L4 at the second dielectric layer 24. Since the refractive index of the second dielectric layer 24 is greater than the refractive index of the first dielectric layer 20, according to the law of refraction, the exit angle of the light L4 is smaller than the incidence angle of the light L3. Therefore, the light L4 converges toward the light shielding portion 28 more than the light L3. Next, the light L4 is converged, by the liquid crystal layer 16 operating in the first state by the voltage between the first electrode 18 and the second electrode 22, into the light L5 toward the light shielding portion 28. Compared with the display panel shown in FIG. 2, since the light L5 can be further converged toward the light shielding portion 28, the light leakage rate can be further reduced.

In the embodiment of the present disclosure, the light leakage rate of the display panel can be reduced by increasing the refractive index of the second dielectric layer 24.

Table 1 shows the light leakage rate of the related art display panel and the display panel shown in FIG. 2 including the second dielectric layer having different refractive indexes. In the related art display panel, the structure of the related art display panel is the same as that of the display panel shown in FIG. 2 except that the second dielectric layer shown in FIG. 2 is not included. In the example shown in Table 1, the material of the second dielectric layer is silicon nitride, which has a thickness of about 1000 angstroms, the width of the first electrode is 3 microns, and the distance between adjacent first electrodes is 3 microns and the thickness of the first dielectric layer is 1.5 microns. In addition, the light leakage rates in Table 1 are obtained when the display panel is displayed in the dark state. As can be seen from Table 1, compared with the related art display panel, the light leakage rate of the display panel shown in FIG. 2 is significantly reduced, and the larger the refractive index of the second dielectric layer, the smaller the light leakage rate. When the refractive index of the second dielectric layer is 2.095, light leakage of the display panel can be almost completely avoided. It should be noted that the data in the second column and the data in the fifth column are data obtained by integrating sphere measurement, and the data in the third and fourth columns are obtained through theoretical simulation.

TABLE 1

| Thickness of first electrode (angstroms) | Light leakage rate of related art display panel | Light leakage rate of display panel shown in FIG. 2 | | |
| --- | --- | --- | --- | --- |
| | | refractive index of the second dielectric layer is 2.095 | refractive index of the second dielectric layer is 2.05 | refractive index of the second dielectric layer is 1.98 |
| 200 | 0.356% | 0 | 0.0005% | 0.005% |
| 400 | 1.23% | 0 | 0.003% | 0.021% |
| 700 | 2.90% | 0 | 0.008% | 0.051% |

As can be seen from the above description, with the display panel according to the embodiment of the present disclosure, when the display panel is displayed in the dark state, the second dielectric layer having a higher refractive index can refract the light to converge toward the light shield portion 28. When the display panel is in the dark state, without increasing the width of the light shielding portion on the second substrate, the light leakage rate can be effectively reduced, and the display effect can be improved. As can be seen from Table 1, the larger the thickness of the first electrode, the higher the light leakage rate of the display panel. This is because the longer the optical path of light travels, the more divergent the light.

With continued reference to FIG. 2, the display panel may further include a third dielectric layer 26 disposed between the plurality of first electrodes 18 and the first substrate 12. In this example, the second electrode 22 may be disposed between the first substrate 12 and the third dielectric layer 26. In the embodiment of the present disclosure, the third dielectric layer 26 may be an insulating layer, which is used to insulate the plurality of first electrodes 18 from the second electrodes 22.

The display panel shown in FIG. 2 may further include a first alignment layer 32 between the liquid crystal layer 16 and the first substrate 12 and in contact with the liquid crystal layer 16, and a second alignment layer 34 between the liquid crystal layer 16 and the second substrate 14 and in contact with the liquid crystal layer 16. In the embodiment of the present disclosure, the first alignment layer 32 and the second alignment layer 34 are used to align liquid crystal molecules in the liquid crystal layer 16.

In addition, the display panel shown in FIG. 2 may further include a thin film transistor 40 between the first substrate 12 and the first electrode 18 for driving the first electrode 18, for example.

Figure 4:
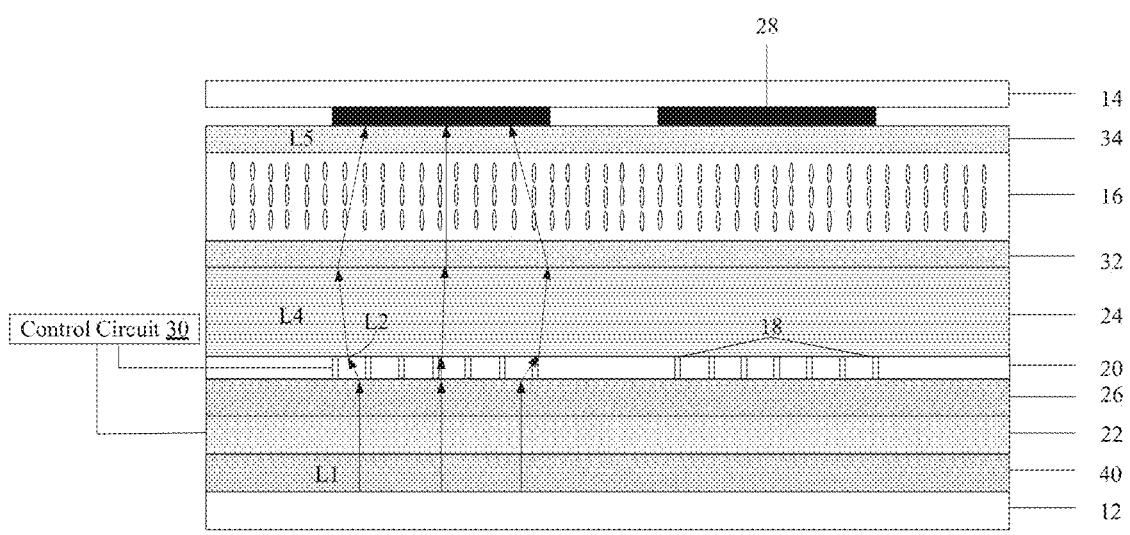
FIG. 4 schematically shows a cross-sectional view of a display panel according to still another embodiment of the present disclosure.

FIG. 4 schematically shows a cross-sectional view of a display panel according to still another embodiment of the present disclosure. As shown in FIG. 4, the structures of the display panel shown in FIG. 4 is the same as that of the display panel shown in FIG. 2 except for the arrangement of the first dielectric layer 20. In the display panel shown in FIG. 4, the surface of the first dielectric layer 20 close to the liquid crystal layer 16 is flush with the surface of the first electrode 18 close to the liquid crystal layer 16, that is, the thickness of the first dielectric layer 20 is equal to the thickness of the first electrode 18.

Figure 5:
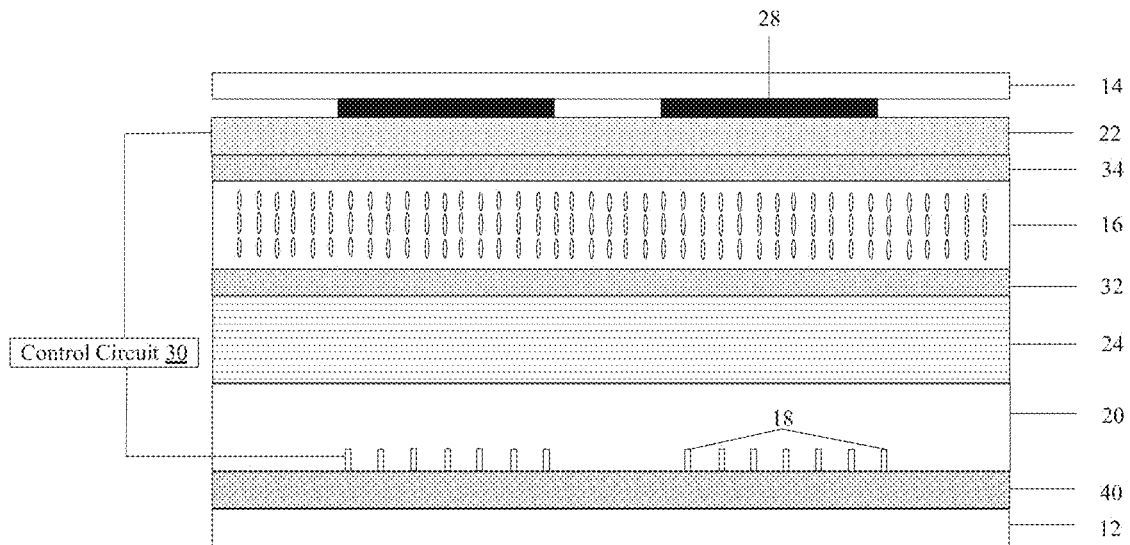
FIG. 5 schematically shows a cross-sectional view of a display panel according to another embodiment of the present disclosure.

In the display panel shown in FIG. 4, when it is displayed in a dark state, as shown in FIG. 4, firstly, the collimated light L1 is diffracted at the first electrode 18 to generate diffracted light L2. Then, since the refractive index of the second dielectric layer 24 is greater than the refractive indexes of the first dielectric layer 20 and the first electrode 18, the light L3 is refracted at the second dielectric layer 24, which is refracted into light L4. According to the law of refraction, the exit angle of the light L4 is smaller than the incident angle of the light L3, so the light L4 converges toward the light shielding portion 28 more than the light L3. Next, the light L4 is converged, by the liquid crystal layer 16 operating in the first state by the voltage between the first electrode 18 and the second electrode 22, into the light L5 toward the light shielding portion 28. When the light L5 reaches the light shielding portion 28 on the second substrate 14, the light L5 can be substantially completely shielded by the light shielding portion, which can effectively reduce the light leakage rate. FIG. 5 schematically shows a cross-sectional view of a display panel according to another embodiment of the present disclosure. The display panel shown in FIG. 5 is different from the display panel shown in FIG. 2 in that the second electrode 22 is disposed on the side 16 of the second substrate 14 close to the liquid crystal layer 16, and the display panel does not include the third dielectric layer 26. The other structures and/or functions in the display panel shown in FIG. 5 are the same as the other structures and/or functions in the display panel shown in FIG. 2 and will not be described in detail here.

Figure 6:
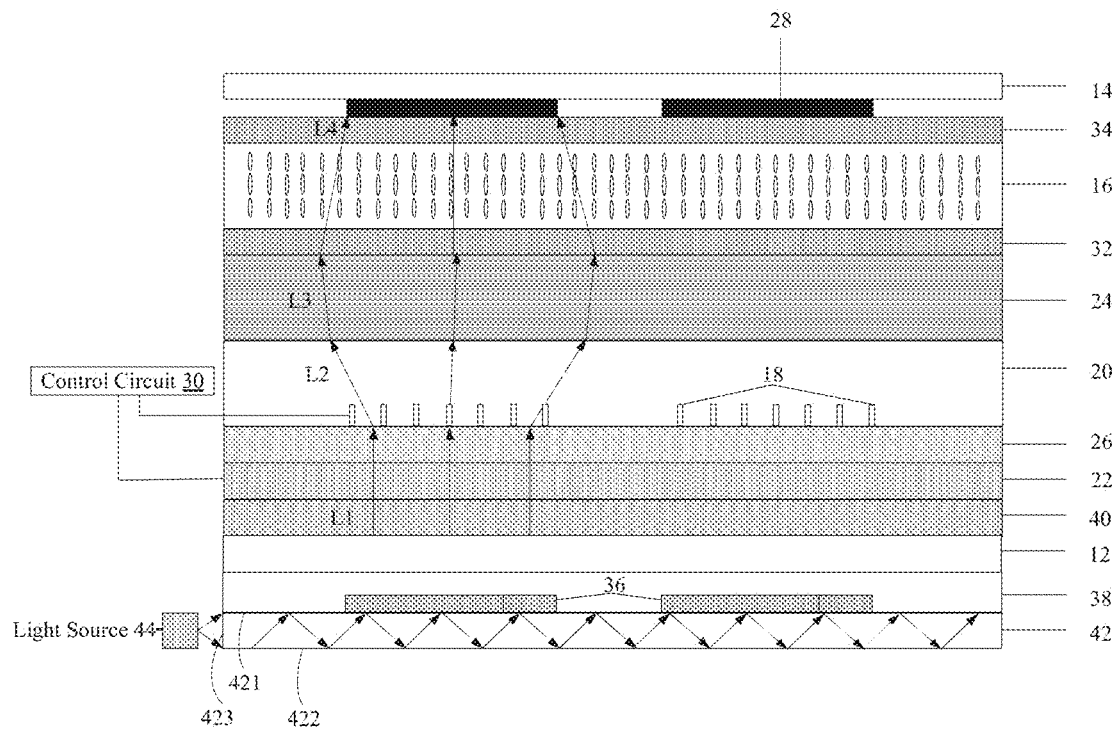
FIG. 6 schematically shows a cross-sectional view of a display apparatus according to an embodiment of the present disclosure.

FIG. 6 schematically shows a cross-sectional view of a display apparatus including the display panel in FIG. 2. The display apparatus shown in FIG. 6 includes, in addition to the display panel in FIG. 2, a light guide plate 42, which may have a light-emitting surface 421, a bottom surface 422 opposite to the light-emitting surface 421, and an end face 423 between the light-emitting surface 421 and the bottom surface 422, light source 44, which is located on a side of the end face 423 of the light guide plate 42, light extraction member 36, which is located on a side of the light-emitting surface 321 of the light guide plate 42.

In the embodiment of the present disclosure, a transparent fourth dielectric layer 38 may also be provided on the light extraction member 36 to planarize the light extraction member 36.

As shown in FIG. 6, the projections of the light extraction member 36 and the light shielding portion 28 on the first substrate 12 at least partially overlap so that the light shielding portion 28 can effectively shield the light emitted from the light extraction member 36.

In the embodiments of the present disclosure, the light source 44 may be a monochromatic light source. As an example, the light source 44 may be a monochromatic LED light source, such as a micro-LED, a monochromatic OLED light source, such as a micro-OLED light source, or a monochromatic laser light source.

In the embodiment of the present disclosure, the light extraction portion 36 may include any one of an inclined grating, a holographic Bragg grating, and a step grating. The specific structure of the light extraction member 36 can be designed according to the incident angle of the incident light emitted by the light source 34.

As shown in FIG. 6, the light emitted from the light source 44 is totally reflected in the light guide plate 42, and after being diffracted or reflected by the light extraction member 36, for example, it can be collimated and emitted from the light extraction member 36. It should be noted that, as shown in FIG. 6, when the angle θ between the light emitted from the light extraction member 36 and the normal of the light guide plate 42 is less than or equal to 0.15 degrees, the light can be considered to be collimated light.

As can be seen from the above description, with the display apparatus according to the embodiment of the present disclosure, when the display apparatus is displayed in the dark state, the second dielectric layer having a higher refractive index can refract the light to converge toward the light shield portion. When the display apparatus is in the dark state, without increasing the width of the light shielding portion on the second substrate, the light leakage rate can be effectively reduced, and the display effect can be improved.

It should be understood that, although the display apparatus shown in FIG. 6 is described by including the display panel shown in FIG. 2 as an example, the display apparatus shown in FIG. 6 may further include the display panel shown in FIG. 4 or FIG. 5, and will not be described in detail here.

Figure 7:
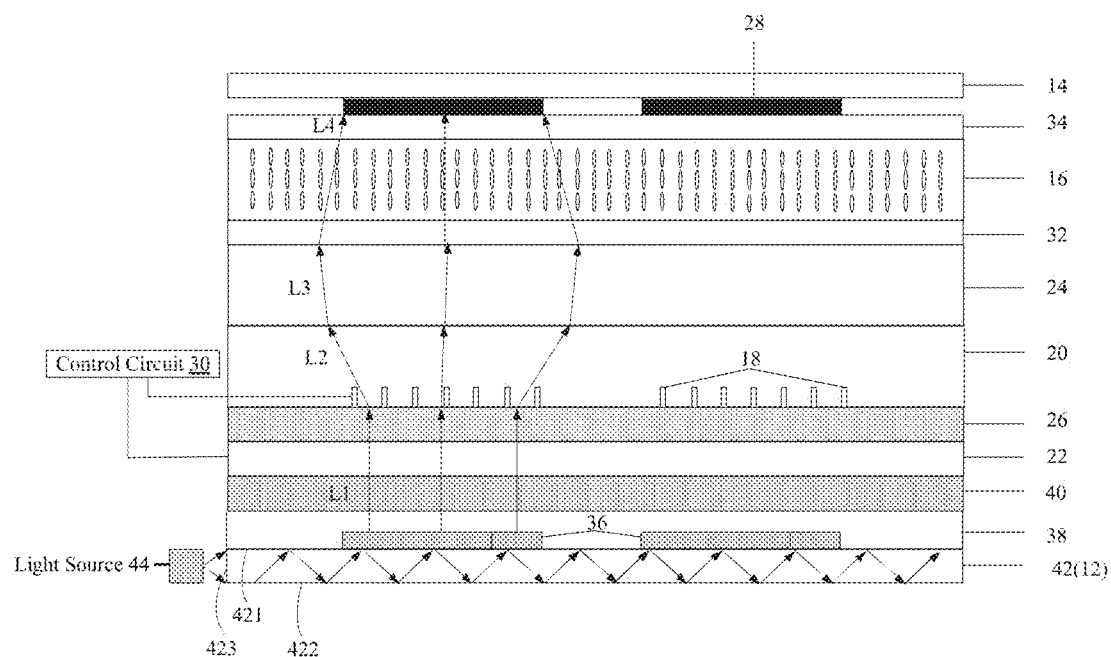
FIG. 7 schematically shows a cross-sectional view of a display apparatus according to yet another embodiment of the present disclosure.

FIG. 7 schematically shows a cross-sectional view of a display apparatus according to yet another embodiment of the present disclosure. Compared with the display apparatus shown in FIG. 6, the display apparatus shown in FIG. 7 multiplexes the first substrate 12 in FIG. 6 into a light guide plate 42. Other structures and/or functions in the display apparatus shown in FIG. 7 are the same as the other structures and/or functions in the display apparatus shown in FIG. 6 and will not be described in detail here.

The specific embodiments of the present disclosure have been described above, but the scope of the present disclosure is not limited thereto. For those skilled in the art, the present disclosure may have various modifications and changes. Any modification, equivalent replacement, improvement, etc. within the spirit and principle of this disclosure shall be included in the protection scope of this disclosure.

What is claimed is:

1. A display panel comprising:
a first substrate;
a second substrate disposed opposite to the first substrate, and a liquid crystal layer between the first substrate and the second substrate;
a plurality of first electrodes disposed on a side, close to the second substrate, of the first substrate and spaced apart at intervals;
a first dielectric layer for planarizing the plurality of first electrodes;
a second electrode disposed between the first substrate and the second substrate;
a second dielectric layer disposed on a side, close to the liquid crystal layer, of the first dielectric layer;
a light shielding portion disposed on the side, close to the liquid crystal layer, of the second substrate; and
a control circuit configured to apply a voltage between the first electrode and the second electrode so that the liquid crystal layer is in a first state or a second state,
wherein, in the first state, the liquid crystal layer is able to converge a light incident from a side, close to the first substrate, of the liquid crystal layer to the light shielding portion,
wherein, in the second state, the liquid crystal layer is able to diffuse the light to a portion between the light shielding portions to exit from the second substrate,
wherein a refractive index of the second dielectric layer is greater than refractive indexes of the first electrode and the first dielectric layer, and
wherein a material of the second dielectric layer comprises silicon nitride, wherein a material of the first dielectric layer comprises resin, and wherein materials of the first electrode and the second electrode comprise transparent conductive materials.

2. The display panel according to claim 1, wherein a surface of the first dielectric layer close to the liquid crystal layer is flush with a surface of the first electrode close to the liquid crystal layer.

3. The display panel according to claim 1, wherein a surface of the first dielectric layer close to the liquid crystal layer covers a surface of the first electrode close to the liquid crystal layer.

4. The display panel according to claim 3, wherein a refractive index of the first dielectric layer is greater than or equal to a refractive index of the first electrode.

5. The display panel according to claim 4, wherein a material of the second dielectric layer comprises silicon nitride, wherein a material of the first dielectric layer comprises resin, and wherein materials of the first electrode and the second electrode comprise transparent conductive materials.

6. The display panel according to claim 2, wherein a thickness of the first electrode is greater than or equal to 200 angstroms, wherein a distance between adjacent first electrodes is less than or equal to 50 micrometers, wherein a thickness of the first dielectric layer is between 1 micrometer and 1.5 micrometers, wherein a thickness of the second dielectric layer is greater than or equal to 1000 angstroms, and wherein a refractive index of the second dielectric layer is between 1.846 and 2.095.

7. The display panel according to claim 3, wherein a thickness of the first electrode is 200 angstroms, wherein a width of the first electrode is 3 μm, wherein a distance between adjacent first electrodes is 3 μm, wherein a thickness of the first dielectric layer is 1.5 μm, wherein a thickness of the second dielectric layer is 1000 angstroms, and wherein a refractive index of the second dielectric layer is 1.98.

8. The display panel according to claim 1, wherein a light leakage rate of the display panel is less than or equal to 0.0051%.

9. The display panel according to claim 1, wherein the plurality of first electrodes are strip-shaped electrodes or dot-shaped electrodes, and wherein the second electrode is a planar electrode.

10. The display panel according to claim 1, further comprising:
- a first alignment layer between the liquid crystal layer and the first substrate and in contact with the liquid crystal layer; and
- a second alignment layer between the liquid crystal layer and the second substrate and in contact with the liquid crystal layer.

11. The display panel according to claim 1, wherein the transparent conductive material comprises indium tin oxide.

12. A display apparatus comprising:
- the display panel according to claim 1; and
- a backlight module located on a side, away from a second substrate, of a first substrate of the display panel.

13. The display apparatus according to claim 12, the backlight module comprising:
- a light guide plate having a light-emitting surface, a bottom surface opposite to the light-emitting surface, and an end face between the light-emitting surface and the bottom surface;
- a light source located on a side of the end face of the light guide plate; and
- a light extraction member located on a side of the light-emitting surface of the light guide plate.

14. The display apparatus according to claim 13, further comprising a light shielding portion located on a side, close to the liquid crystal layer, of the second substrate of the display panel, wherein projections of the light extraction member and the light shielding portion on the first substrate at least partially overlap.

15. The display apparatus according to claim 13, wherein the light source comprises a monochromatic LED light source, a monochromatic OLED light source, or a monochromatic laser light source.

16. The display apparatus according to claim 13, wherein the light extraction member comprises any one of an inclined grating, a holographic Bragg grating, and a step grating.

17. The display apparatus according to claim 13, wherein the second substrate further serves as the light guide plate.

18. The display panel according to claim 4, wherein a thickness of the first electrode is 200 angstroms, wherein a width of the first electrode is 3 μm, wherein a distance between adjacent first electrodes is 3 μm, wherein a thickness of the first dielectric layer is 1.5 μm, wherein a thickness of the second dielectric layer is 1000 angstroms, and wherein a refractive index of the second dielectric layer is 1.98.

19. A display apparatus comprising:
- the display panel according to claim 2; and
- a backlight module located on a side, away from a second substrate, of a first substrate of the display panel.

* * * * *